Aug. 19, 1958 R. P. ATKINSON ET AL 2,848,284
BEARING OIL SCAVENGER
Filed June 20, 1957

INVENTOR.
Robert P. Atkinson, &
BY Frederick W. Hoeltje
Paul Fitzpatrick
ATTORNEY

2,848,284

BEARING OIL SCAVENGER

Robert P. Atkinson and Frederick W. Hoeltje, Indianapolis, Ind., assignors to General Motors Corporation, Detroit, Mich., a corporation of Delaware Application June 20, 1957, Serial No. 666,898

3 Claims. (Cl. 308—187)

Our invention relates to improved arrangements for scavenging oil supplied to anti-friction bearings of high speed machines.

The embodiment described herein to illustrate the invention is in connection with a bearing at the inlet end of a compressor. In such an installation, the compressor shaft bearing must be supplied liberally with lubricating oil, but it is important to prevent escape of the oil into the blade system of the compressor where it would cause fouling. The invention provides a rotating slinger and a stationary receiver and deflector for the oil which flows through the bearing, the deflector returning it to the side of the bearing at which it is supplied, where it may be received in a suitable sump remote from the compressor rotor. The principles of the invention are also applicable to other bearing installations.

The principal objects of the invention are to improve the scavenging of oil supplied to bearings and to prevent escape of oil from a bearing into a rotating machine.

The nature of the invention and the advantages thereof will be apparent to those skilled in the art from the succeeding detailed description of the preferred embodiment of the invention and the accompanying drawings thereof.

Figure 1:
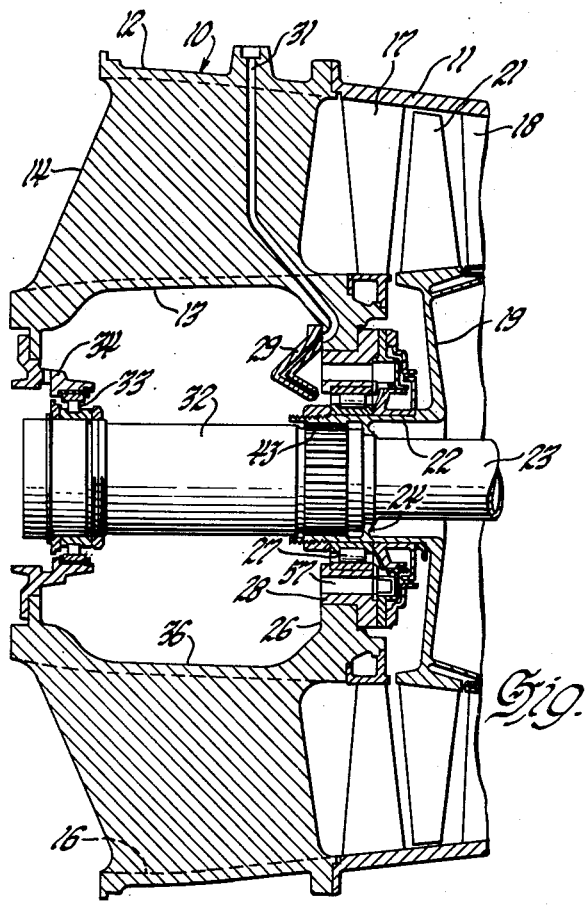
Figure 1 is a sectional view of the inlet end of an axial-flow compressor, the section being taken on a plane containing the axis of the compressor.

Referring first to Figure 1 for a description of the environment of the oil scavenging arrangement, the axial-flow compressor comprises an inlet housing and bearing support 10 and a case 11 fixed to the inlet housing. The inlet housing comprises an outer shell 12, an inner shell 13, and struts 14 extending between the shells. The compressor air inlet 16 is defined by the space between shells 12 and 13. Inlet guide vanes 17 and additional stator vanes 18 are mounted in the case 11. The compressor rotor comprises a first stage wheel 19 mounting rotor blades 21. Wheel 19 includes a forwardly extending stub shaft 22. The head of a hollow tie bolt 23 engages an inwardly extending flange 24 on stub shaft 22. This tie bolt is coupled to the last stage compressor wheel and intermediate compressor wheels are mounted between the two end wheels, the structure being similar to that of Patent No. 2,675,174. The forward wheel only of the compressor is shown since it is not necessary to show the remaining structure to illustrate the environment of the invention.

An annular web 26 extends inwardly from shell 13 of the inlet housing to provide a support for roller bearing 27 in which the stub shaft 22 is mounted for rotation. Bearing 27 is mounted in a cage 28 fixed to the web 26 and forming part thereof. Lubricating oil is supplied to bearing 27 by a jet fitting 29 fixed to web 26 and supplied by a passage 31 extending through one of the struts 14. An extension shaft 32 is splined at its rearward end into the forward end of stub shaft 22 and is mounted in a roller bearing 33 mounted in a support 34 fixed to the forward end of the inlet housing 10. Shaft 32 may be used to take power from an engine of which the compressor is a part.

The lower portion 36 of the space within the shell 13 provides a sump for oil returning from the bearings 27 and 33 from which it may be withdrawn by suitable means (not shown).

Figure 2:
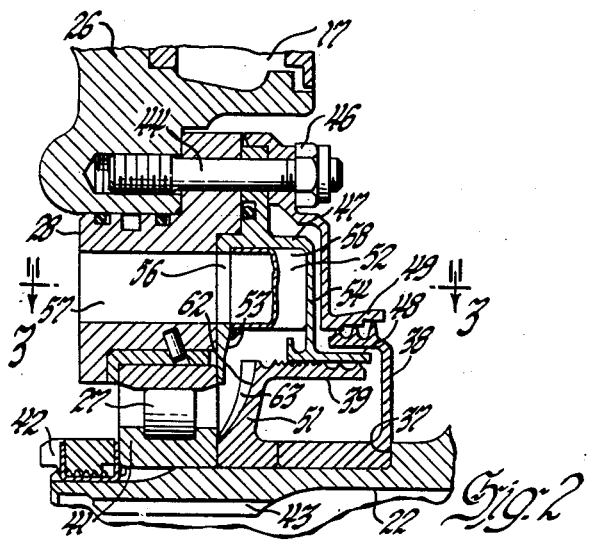
Figure 2 is an enlarged view of a portion of Figure 1.
Figure 3:
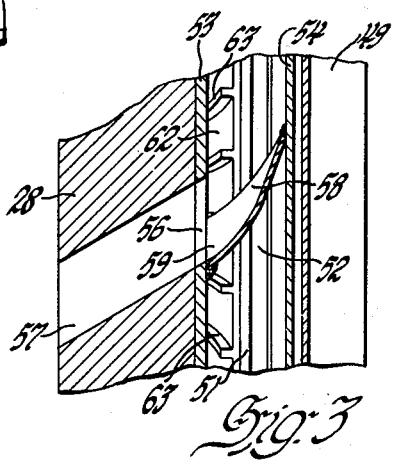
Figure 3 is a fragmentary sectional view taken on the plane indicated by the line 3—3 of Figure 2.

Proceeding now to the oil scavenging structure of the invention, which is shown more clearly in Figure 2, a shoulder 37 is provided on the stub shaft 22. A first stage rotating labyrinth seal member 38, a second stage rotating labyrinth seal member 39, and the inner race 41 of bearing 27 are retained on the stub shaft against the shoulder 37 by a nut 42. Splines 43 on the shaft are for coupling to the shaft 32. Studs 44 and nuts 46 retain the bearing cage 28 in a shouldered recess in the web 26. Studs 44 also retain a scavenge oil receiving member 47, which is integral with the stationary portion 48 of the second stage labyrinth seal, and the first stage stationary labyrinth seal member 49. The member 39 on the shaft which provides the second stage rotating seal part also defines an oil slinger 51 adjacent the rear side of bearing 27. Slinger 51 is adapted to throw oil passing through bearing 27 into an annular receiving chamber 52 defined between the walls 53 and 54 of member 47. The inner margin of chamber 52 is open. A number of holes 56, preferably eight, are drilled in the wall 53 and are aligned with holes or passages 57 through the bearing cage 28. These oil return passages are distributed around the axis of the shaft. A deflector or turning vane 58 is mounted at each opening 56. The deflector is a somewhat shovel-shaped plate extending from the wall 53 to the wall 54 of member 47 and welded to both walls. As will be most clearly apparent from Figure 3, the outlet end 59 of the deflector is semi-circular in cross-section and aligns with one side of opening 56. The deflector 58 is at a substantial angle to the axial direction so that it deflects oil and oil laden air thrown into chamber 52 by slinger 51, which will be travelling outwardly and circumferentially of the shaft, into the passages 57 through which it returns to the forward side of web 26 and falls into the sump 36. It will be noted that passages 57 are skewed to the axis of the engine, which reduces the amount of turning of the fluid from its generally tangential path.

The slinger 51 is similar in structure to a small centrifugal fan. It has a dished annular face 62 and radially extending ribs or vanes 63 projecting from the face 62.

In the operation of the engine, stub shaft 22 turns at high speed, with the upper side of the shaft turning toward the point of view as illustrated in Figures 1 and 2. Some of the oil jetted at the bearing from the fitting 29 flows through the bearing and strikes the slinger 51. The vanes 63 of the slinger impel the oil outwardly into the chamber 52, and pump some air with the oil. The oil leaves the slinger more or less tangentially and flows into the chamber 52 where it engages the deflectors 58, which turn it into a path forwardly through the holes 56, 57. The arrangement of the deflectors prevents the oil from circulating in the chamber 47 or accumulating in the lower part of the chamber, as it is immediately deflected through the bearing support 28. The small amount of air leaking through the labyrinth seals also is vented through holes 57 to the sump.

The detailed description of the preferred embodiment of the invention for the purpose of explaining the principles thereof is not to be construed as restricting the invention. Many modifications of structure may be made by exercise of skill in the art within the principles of the invention.

We claim:

1. The combination of a supporting web, a bearing mounted in the web, a shaft mounted in the bearing, means for supplying oil to the bearing, an oil slinger on the shaft adjacent the bearing, the slinger having a radially ribbed surface facing the bearing, means defining an annular oil-receiving chamber on the web surrounding the periphery of the slinger and open at its radially inner side to receive oil from the slinger, a number of deflectors extending across the chamber adapted to deflect oil from a circumferential path in the chamber toward the web, and means providing a passage through the web at each deflector to transmit the oil through the web.

2. The combination of a supporting web, a rolling contact bearing mounted in the web, a shaft mounted in the bearing, means on one side of the web for supplying oil to the bearing, an oil slinger on the shaft adjacent the bearing at the other side of the bearing from the supplying means, the slinger having a radially ribbed general conical surface facing the bearing, means defining an annular oil-receiving chamber on the web surrounding the periphery of the slinger and open at its radially inner side to receive oil from the slinger, a number of deflectors extending across the chamber adapted to deflect oil from a circumferential path in the chamber toward the web, and a passage through the web at each deflector to transmit the oil through the web.

3. The combination of a bearing, a shaft mounted in the bearing, means for supplying oil to the bearing, an oil slinger on the shaft adjacent the bearing, the slinger having a radially ribbed generally conical surface facing the bearing, fixed means defining an annular oil-receiving chamber surrounding the periphery of the slinger and open at its radially inner side to receive oil from the slinger, and a number of turning vanes distributed around the shaft extending across the chamber adapted to deflect oil from a circumferential path in the chamber into a direction generally axial of the shaft.

References Cited in the file of this patent

UNITED STATES PATENTS

| | | |
|---|---|---|
| 1,769,736 | Fieux | July 1, 1930 |
| 2,042,575 | Worth | June 2, 1936 |
| 2,681,837 | Boyd et al. | June 22, 1954 |
| 2,770,506 | Derner | Nov. 13, 1956 |

FOREIGN PATENTS

| | | |
|---|---|---|
| 749,949 | Great Britain | June 6, 1956 |